US012085256B2

(12) United States Patent
Kay

(10) Patent No.: US 12,085,256 B2
(45) **Date of Patent: *Sep. 10, 2024**

(54) METHOD FOR CREATING A RECESSED CURVED CHANNEL LIGHT SYSTEM

(71) Applicant: PureEdge Lighting LLC, Chicago, IL (US)

(72) Inventor: Gregory L. Kay, Chicago, IL (US)

(73) Assignee: PureEdge Lighting LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,386

(22) Filed: Aug. 30, 2023

(65) Prior Publication Data

US 2024/0060609 A1 Feb. 22, 2024

Related U.S. Application Data

(63) Continuation of application No. 17/817,420, filed on Aug. 4, 2022, now Pat. No. 11,746,969.

(51) Int. Cl.

| | |
|---|---|
| ***F21S 8/02*** | (2006.01) |
| ***F21S 4/28*** | (2016.01) |
| *F21Y 115/10* | (2016.01) |

(52) U.S. Cl.

CPC . *F21S 8/02* (2013.01); *F21S 4/28* (2016.01); *F21Y 2115/10* (2016.08)

(58) Field of Classification Search

CPC ........................................ F21S 8/02; F21S 4/28

See application file for complete search history.

(56) References Cited

U.S. PATENT DOCUMENTS

| | | | | |
|---|---|---|---|---|
| 10,190,738 | B1 * | 1/2019 | James | F21S 4/28 |
| 10,724,720 | B1 * | 7/2020 | Heredia | F21V 21/35 |
| 11,499,685 | B1 * | 11/2022 | Flynn | F21S 4/20 |
| 11,499,686 | B1 * | 11/2022 | Machlis | F21V 5/04 |
| 2017/0051895 | A1 * | 2/2017 | Gielen | F21V 3/02 |
| 2018/0320840 | A1 * | 11/2018 | Machlis | F21V 17/002 |
| 2021/0231289 | A1 * | 7/2021 | Pruitt | F21V 3/02 |

* cited by examiner

*Primary Examiner* — Christopher E Dunay

(74) *Attorney, Agent, or Firm* — Bishop Diehl & Lee, Ltd.

(57) ABSTRACT

A method for creating a curving recessed lighting system having a plurality of housing sections, an LED strip (or two), and a flexible diffuser. Each housing section includes a base portion having an opening, a first flange having a first width and extending outward from the base portion, and a second flange having a second width and extending outward from the base portion in a direction opposite and coplanar to the first flange. Further, when the housing sections are arranged sequentially, the first and second flanges form two curved surfaces and the base portions in consecutive housing sections align to form a curved channel between the two curved surfaces. Preferably, the base portion of each of the plurality of housing sections has a depth not greater than ⅝ inches (0.625 inches). This allows flush placement in standard drywall without the need for notching studs.

11 Claims, 12 Drawing Sheets

METHOD FOR CREATING A RECESSED CURVED CHANNEL LIGHT SYSTEM

RELATED APPLICATION

The present application is a Continuation of and claims a filing priority to co-pending U.S. patent application Ser. No. 17/817,420 titled “Recessed Curved Channel Light System” and filed on Aug. 4, 2022. The ’420 application is hereby incorporated by reference in its entirety.

TECHNICAL FIELD OF THE INVENTION

The present invention relates to lighting systems. More specifically, the invention relates to customizable recessed lighting systems.

BACKGROUND OF THE INVENTION

Lighting is an important feature when designing or creating a work environment or living space. It is not enough that the lighting provides sufficient illumination to an area. Lighting and lighting fixtures have an aesthetic function as well. When done properly, lighting can be dynamic and flow as a user moves within the space. A commonly used permanent lighting design is recessed lighting where fixtures are recessed within a surface. The most popular recessed lights are circular, known as can lights, used in a ceiling surface. However, recessed channel lighting is used in ceilings and walls as well.

Recessed channel lights are different than track lighting in that they are installed, for example, into a hollow opening—usually a continuous channel—in a ceiling or wall surface (i.e., wall board). When installed, it appears that light is shining from the channel in the surface. Typically, little if any of the actual recessed lighting fixture is observable.

However, recessed lights are fixed light sources which cannot be readily moved without some skilled electrical re-wiring and surface patching. As a result, recessed lighting is often used as an accent to highlight another feature of a space. Another drawback of recessed lighting is that it requires either the lights be positioned between joists, or joists must be notched or altered in some way to accommodate the recessed fixture if it extends across joists. The cutting of ceiling or wall joists is time-consuming and, in many cases, an undesirable option.

Further, recessed lighting tends to have a “static” appearance, being comprised of circles and straight lines. This can limit creativity and, as a result, the aesthetics of recessed lighting.

The present invention provides a lighting system without the aesthetic drawbacks of prior lighting systems and without the lighting and installation limitations of standard recessed lights. By providing a customizable curving lighting system, aesthetics are significantly improved. The present lighting system can be installed without exposure of unsightly brackets and tracks and without the need to notch or otherwise alter existing studs or joists.

Until the invention of the present application, these and other problems in the prior art went either unnoticed or unsolved by those skilled in the art. The present invention provides a recessed channel lighting system which is capable of multiple configurations with the associated light fixtures without sacrificing design, style or affordability.

SUMMARY OF THE INVENTION

There is disclosed herein an improved method for creating a recessed channel lighting system which avoids the disadvantages of prior devices, methods and systems while affording additional structural and operating advantages.

Generally speaking, a preferred method comprises creating a curved lighting design, creating a channel in a surface which follows the design, and installing a recessed lighting system within the surface channel. The recessed lighting system comprises a plurality of housing sections, an LED strip, and a flexible diffuser. Preferably, each housing section comprises a base portion having an opening, a first flange having a first width and extending outward from the base portion, and a second flange having a second width and extending outward from the base portion in a direction opposite and coplanar to the first flange. Further, when the plurality of housing sections are arranged sequentially, the first and second flanges form two curved surfaces and the base portions in consecutive housing sections align to form a curved channel between the two curved surfaces.

In specific embodiments of the recessed lighting system, the base portion of each of the plurality of housing sections has a depth not greater than ⅝ inches (0.625 inches). This allows flush placement in standard drywall without the need for notching studs.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
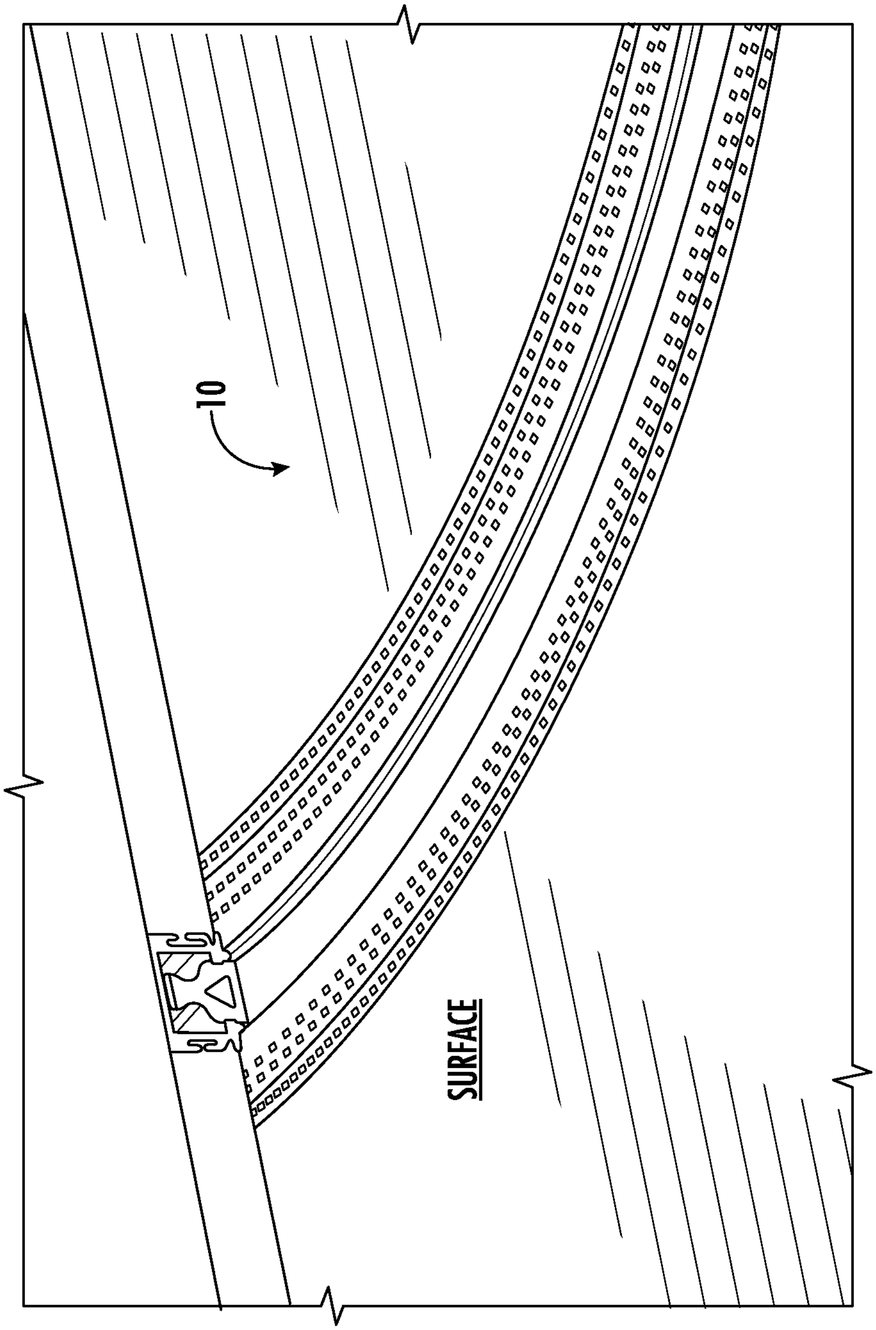
FIG. 1 is a perspective view of an embodiment of the disclosed recessed channel lighting system installed in a ceiling surface.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-14, there is illustrated at least one embodiment of a recessed channel lighting system, generally designated by the numeral 10. The particular illustrated channel lighting system 10 is for a ceiling or wall. However, while all the embodiments illustrated are directed to a ceiling or wall, it should be understood that the principles of the invention can be more broadly applied to installation on a surface of any type, as long as there is sufficient depth for the system to be recessed.

Beginning with FIG. 1, the channel lighting system 10 is shown in a preferred configuration. The system 10 can be customized to almost any design, including curves, as it is recessed within a surface (e.g., a ceiling, wall). As will be described and illustrated, the lighting system 10 is designed to cross wall and ceiling studs without requiring notching.

Figure 2:
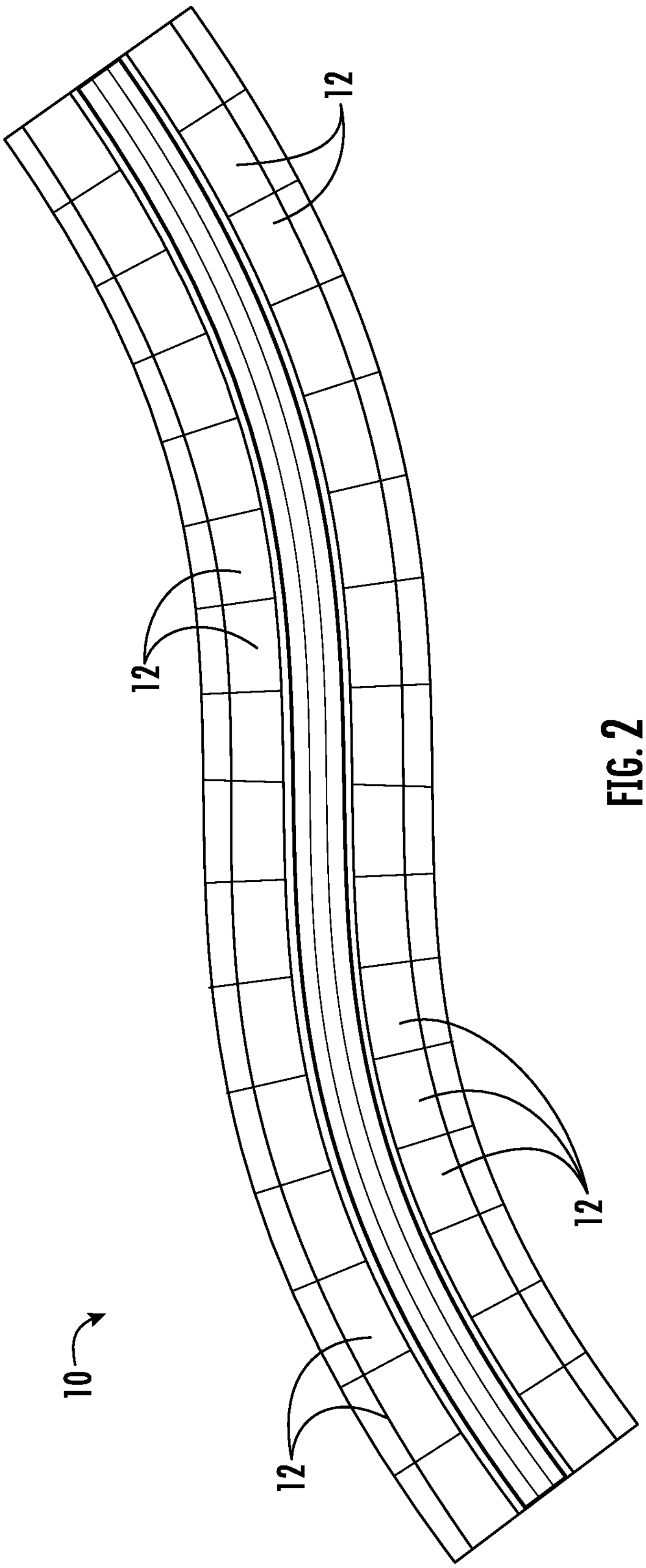
FIG. 2 is a top view of a curved segment of an embodiment of the disclosed recessed channel lighting system.
Figure 3A:
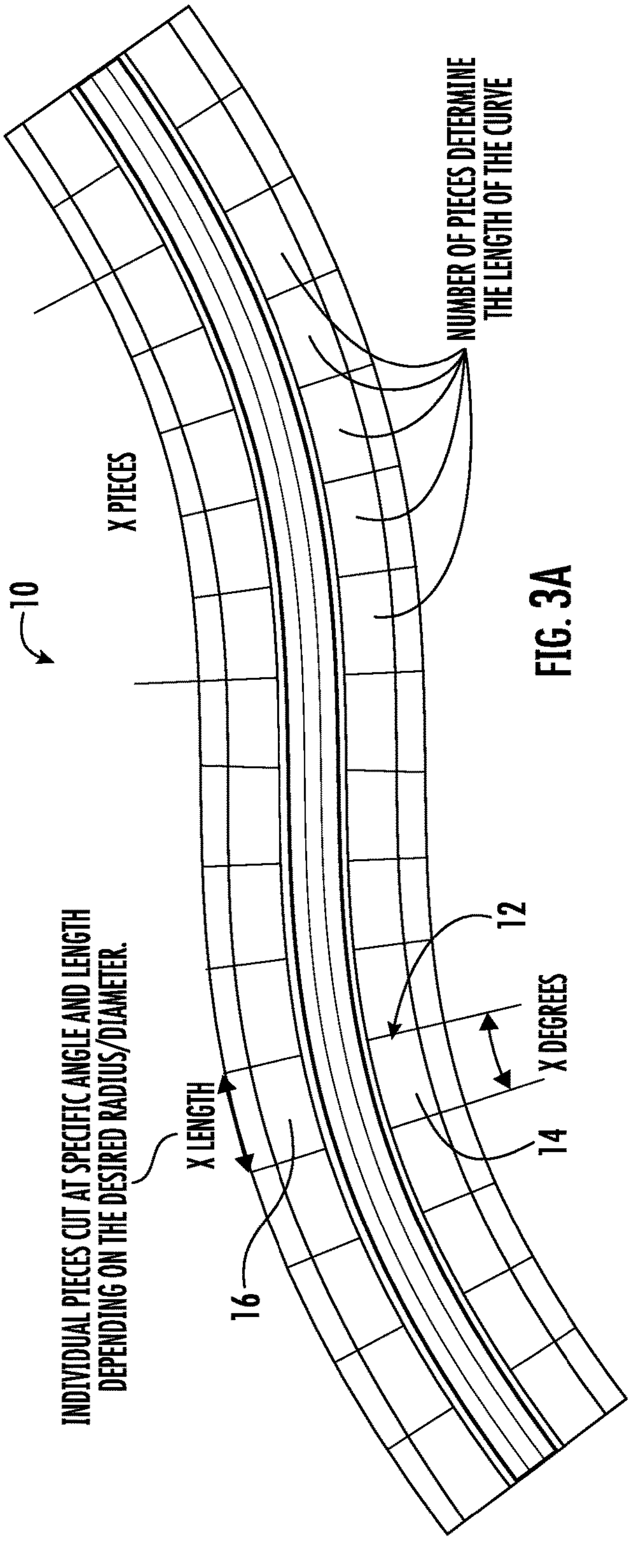
FIG. 3A is a top view similar to FIG. 2, highlighting individual sections of the segment.
Figure 3B:
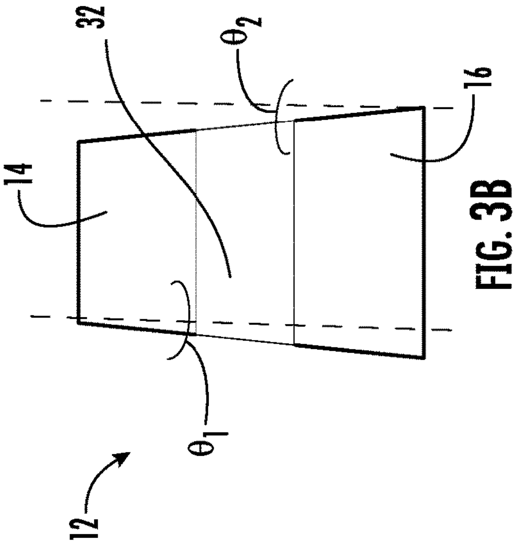
FIG. 3B is a top view of an individual section showing two angles of taper used to create a curved display.

Referring now to FIGS. 2, 3A and 3B, the channel lighting system 10 is shown to be comprised of a series of individual sections 12 arranged sequentially (i.e., abutting one another) to form a curving light display. As shown in FIG. 3B, each section 12 is formed with a first flange 14 and a second flange 16, each of which extend from a top edge of base portion 20 to define opening 32. The flanges, 14 and 16, are each cut at a specific angle and length to create a desired radius or curve. For example, the first and second flanges, 14 and 16, respectively, are cut along the abutting surfaces to taper from one outside edge to the other. As each section 12 has two abutting sides—i.e., left side and right side—there are two possible angles of taper, $\Theta_1$ and $\Theta_2$. The "angle of taper" is defined as the absolute value of the angle measure at any corner of the flange edge from square. The two angles of taper, $\Theta_1$ and $\Theta_2$, may be identical or different along each side of the individual sections 12. The total curve for an individual section 12 is determined by adding $\Theta_1$ and $\Theta_2$ together (i.e., $\Theta_1+\Theta_2$). Arranging the individual sections 12 allows a user to create curves in either direction by changing the direction of the taper.

Figure 4:
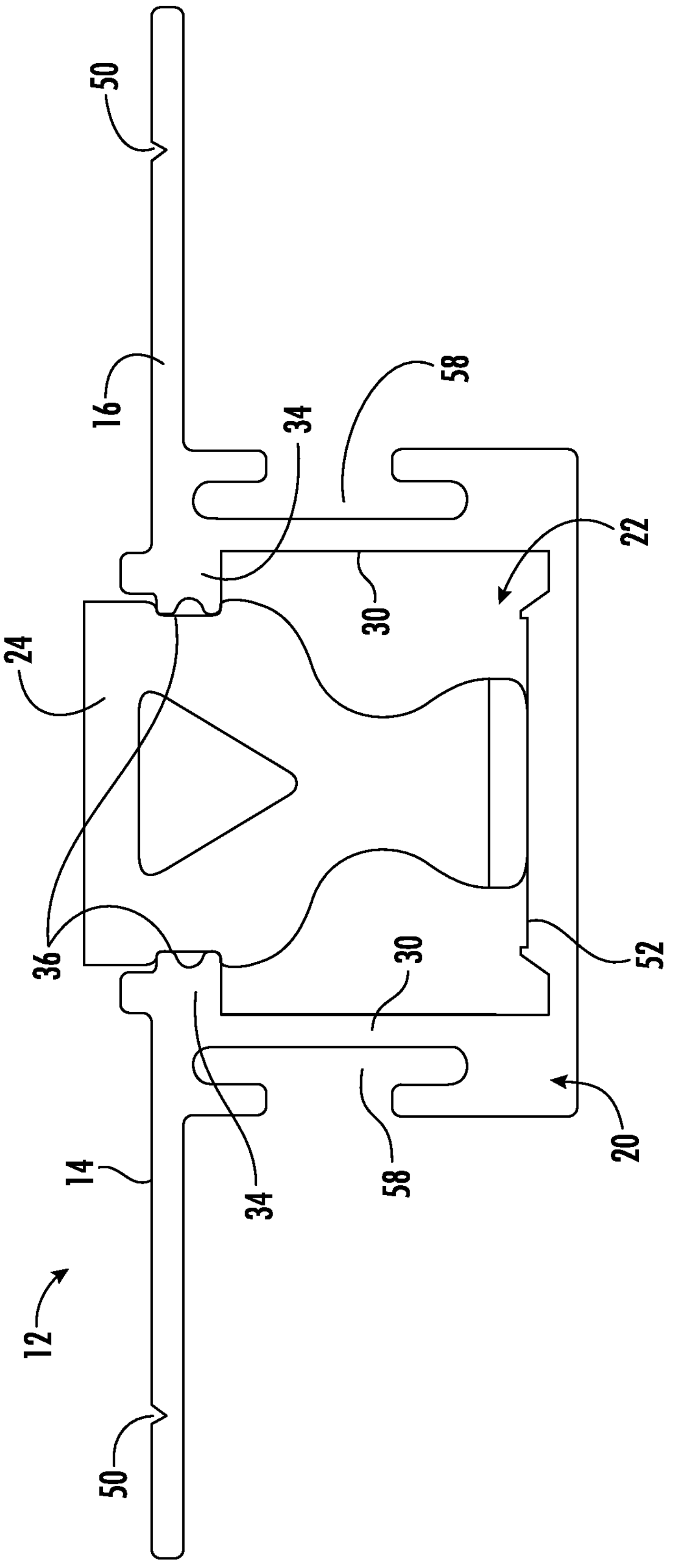
FIG. 4 is a cross-sectional view of an embodiment of a segment of the disclosed recessed channel lighting system.

FIG. 4 is a cross-section of an individual section 12 which shows additional detail. Each of the individual sections 12 of the system 10 include a "U-shaped" base portion 20, open at a top between the flanges 14, 16, and having interior sidewalls 30 and a bottom wall 52. On each side of the base portion 20 is a slot 58 used to connect individual sections 12 together, as described further below. Ultimately, when the individual sections 12 are sequentially arranged and connected, the U-shaped base portion 20 forms a continuous channel 22 which curves as the angled flanges 14, 16 dictate, as shown in FIGS. 2 and 3A. A flexible lens or diffuser 24 is securely positioned within the U-shaped base portion 20 resting against the bottom wall 52. The diffuser 24 is used to direct light outward, as will also be described further below.

The two flanges, 14 and 16, are preferably perforated or scored 50 to facilitate adhesion of a joint compound (or similar building material) to conceal the system 10 within a surface after being positioned within the surface. The perforation or score 50 may also be used to tack the system 10 to a surface using nails, screws, or the like (not shown).

A length and degree of curve in the lighting system 10 is determined by the number of individual sections 12 used and the angle of taper for each section. For example, a 30° curve could be created with six individual sections 12 each having 5° of taper ($\Theta_1+\Theta_2$). Alternatively, the curve could be less sharp (i.e., longer) by using 10 individual sections 12 each having 3° of taper.

Figure 5:
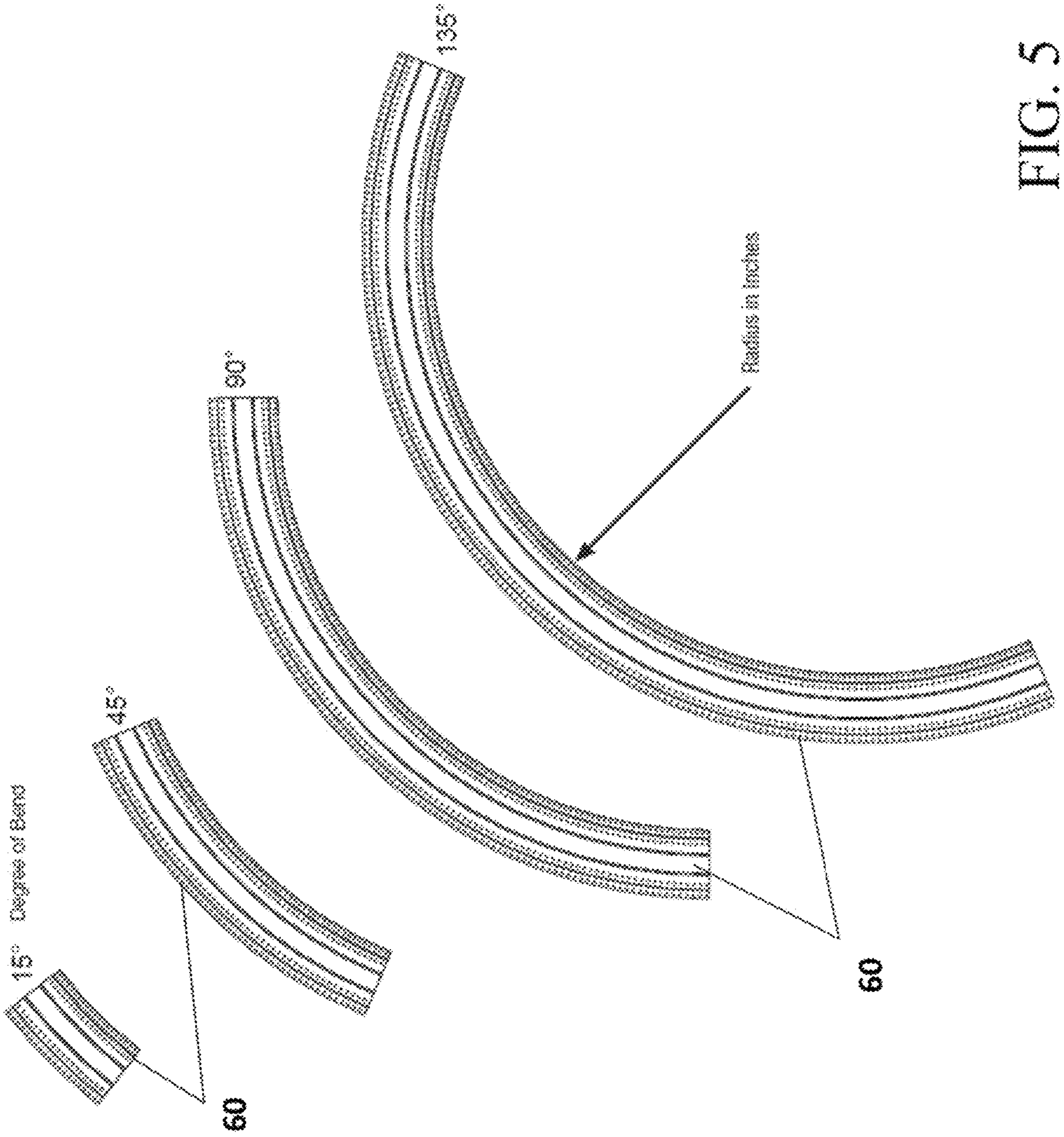
FIG. 5 is a top view of four constructed curved sections of the disclosed recessed channel lighting system, including 15°, 45°, 90°, and 135° sections.

As shown in FIG. 5, the system 10 may include pre-fabricated sections 60 of the most common and useful lengths and curves—e.g., 15°, 45°, 90°, 135°, etc. The pre-fabricated sections 60 could be provided in various lengths for each curve. Preferably, pre-fabricated sections 60 would be constructed using a single housing (i.e., base portion 20) to save time, as opposed to a connecting together a plurality of individual sections 12.

Figure 6:
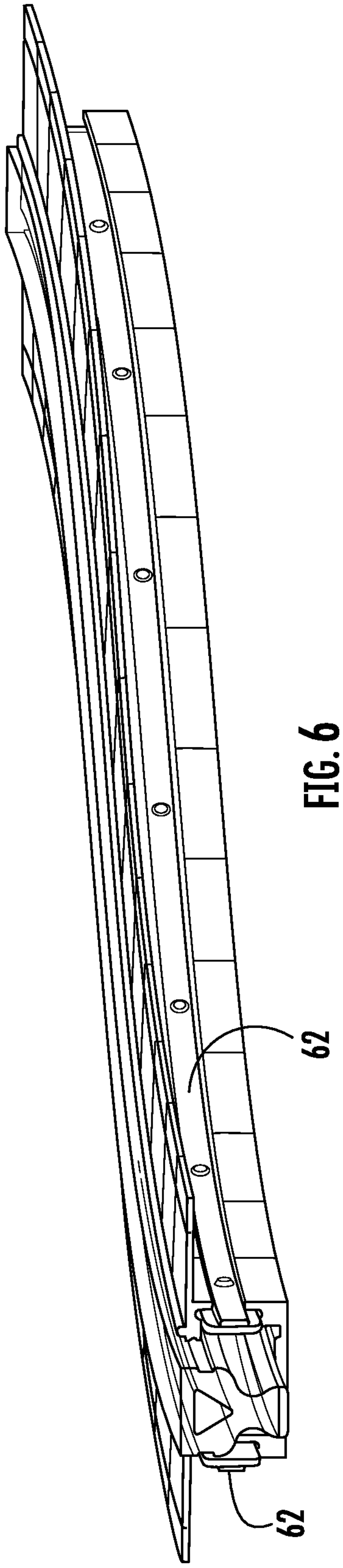
FIG. 6 is a side perspective view of a section of the disclosed recessed channel lighting system.
Figure 7:
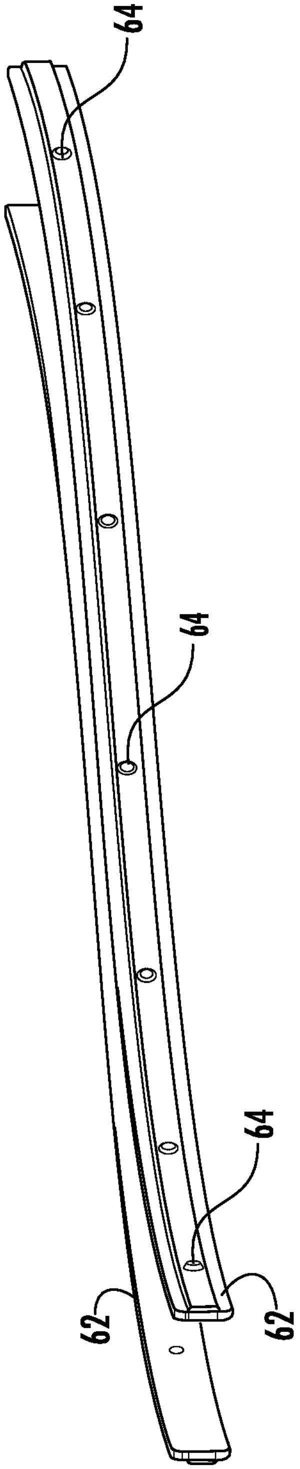
FIG. 7 is a side perspective view showing an embodiment of flexible connector strips used to hold individual sections together.

FIGS. 6 and 7 illustrate how the individual sections 12 and pre-fabricated sections 60 are connected to one another. Once the individual sections 12 are cut to a preferred angle, each section 12 can be threaded onto a flexible metal connecting strap 62 via one of either slot 58 on the base portion 20 (see FIG. 4). Set screws 64 can be used to secure each section 12 to the flexible metal connecting strap 62.

Figure 8B:
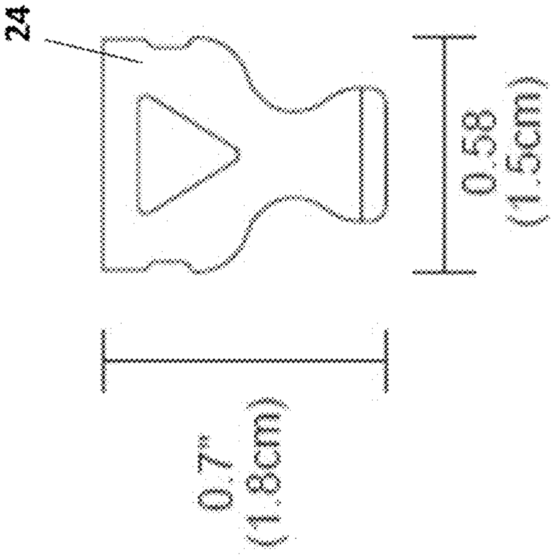
FIG. 8B is a cross-sectional view of the embodiment of the flexible diffuser shown in FIG. 8A.
Figure 8A:
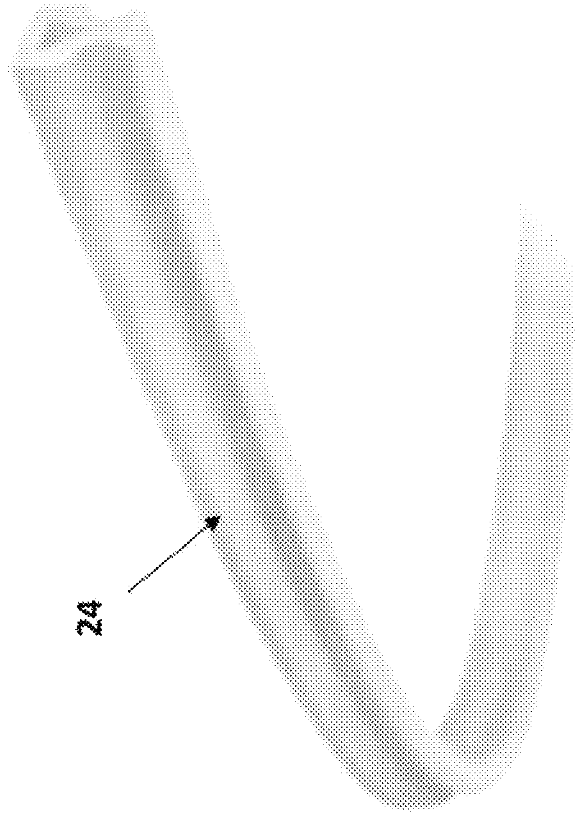
FIG. 8A is a perspective view of an embodiment of the flexible diffuser.

A section of the diffuser 24 is illustrated in FIG. 8A with a cross section shown in FIG. 8B. The diffuser 24 is preferably comprised of an extruded translucent silicone material. The diffuser 24 is flexible and is intended to bend and curve as the resulting opening 32 and channel 22 require. The diffuser 24 is easy to cut, so it can be made to almost any length and remain flexible. The shape of the diffuser 24 is unique and assists in directing light outward. However, the number of alternate shapes which would be effective for the disclosed lighting system 10 are numerous.

Figure 9:
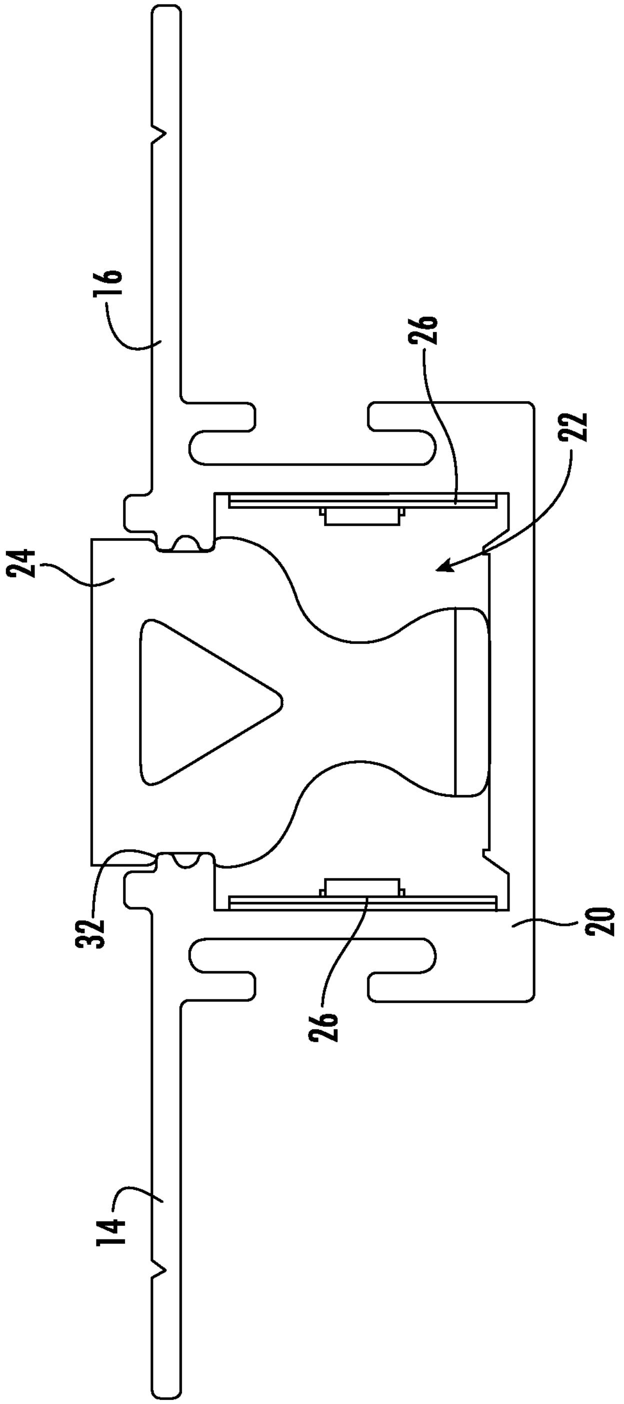
FIG. 9 is a cross-section of a segment of the disclosed recessed channel lighting system.
Figure 10:
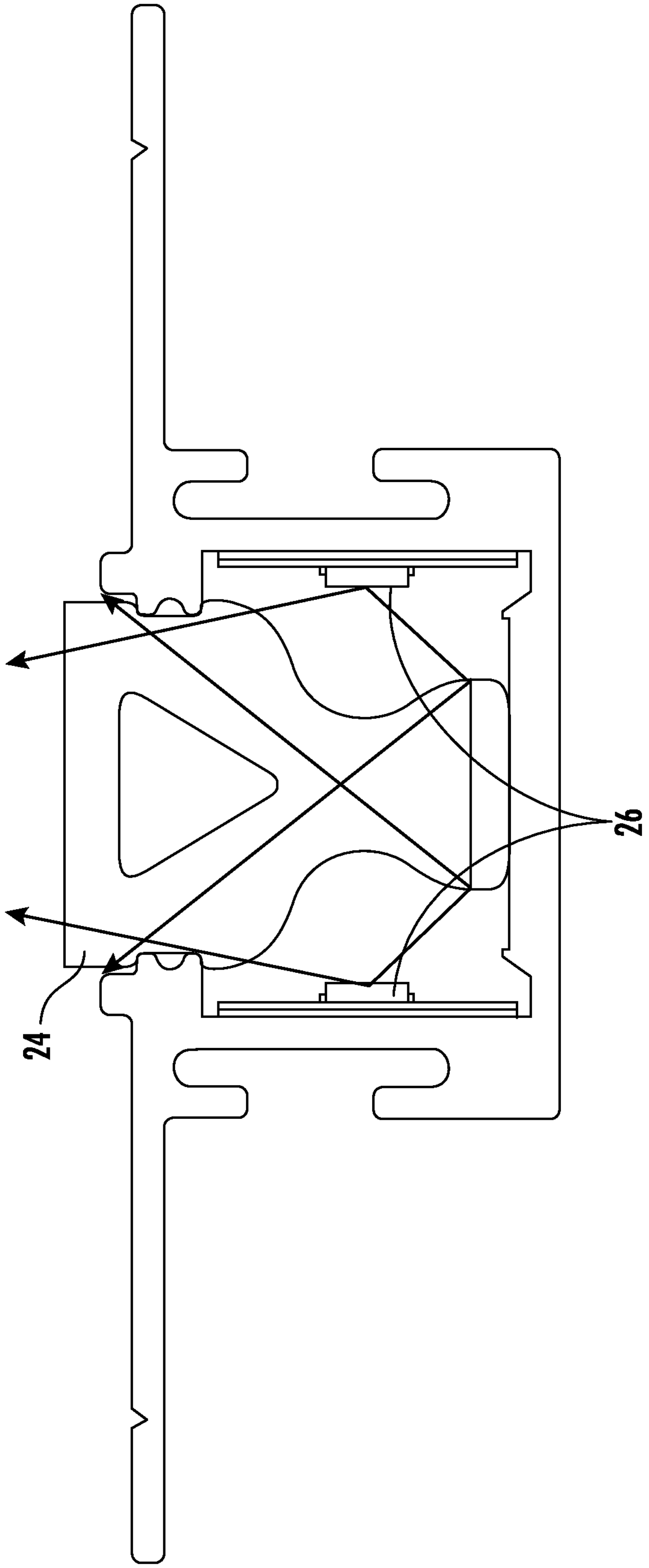
FIG. 10 is a cross-section of a segment similar to FIG. 9 showing light being directed outward from the channel.

Referring now to FIGS. 9 and 10, a cross-section of a housing section 12 is illustrated for better understanding. The profile of the base portion 20 is preferably shallow enough to fit within ⅝-inch drywall (approx. 0.625 inches or 1.59 cm). This feature allows the system 10 to be placed in a typical wall or ceiling without having to notch studs or joists. Further, the base portion 20 has a channel width of sufficient size to allow placement of LED strips 26 along at least one of the interior walls 30 (see FIG. 4). Preferably, LED strips 26 are placed along both interior walls 30 for maximum light.

As previously noted, the base portion 20 has an opening 32 at the surface between the flanges 14, 16. The flexible diffuser 24 is preferably fitted within the opening 32. Protuberances 34 on each edge of the opening help to secure the diffuser 24 within the opening 32. Preferably, the diffuser 24 would have a corresponding recess or channel to allow sliding of each housing section 12 onto the diffuser 24.

Light from the LED strips 26 is directed inward at the diffuser 24, as shown in FIG. 8. However, the body of the diffuser 24 is configured such that the light which enters the diffuser is refracted toward the opening 32, as illustrated by the arrows. The LED strips 26 may be white light or colored lights, as dictated by the desired result by the user/designer. Further, the LED strips 26 may be the same or different colors to create a desired effect.

Figure 11:
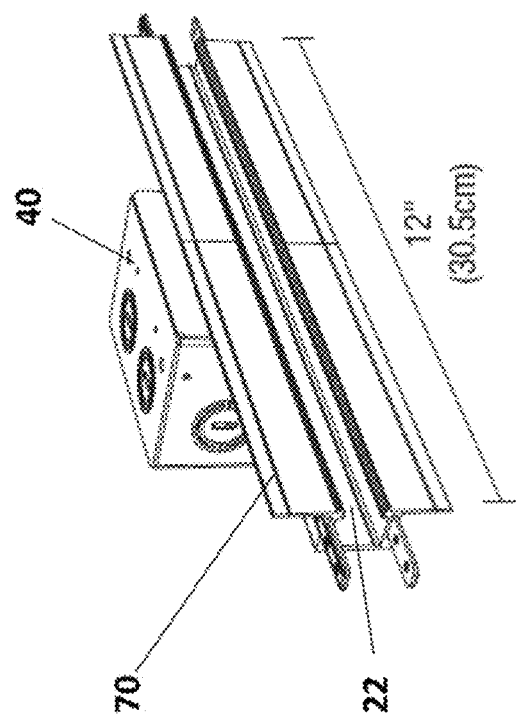
FIG. 11 is a perspective view of an embodiment of a center feed power channel connector.
Figure 12:
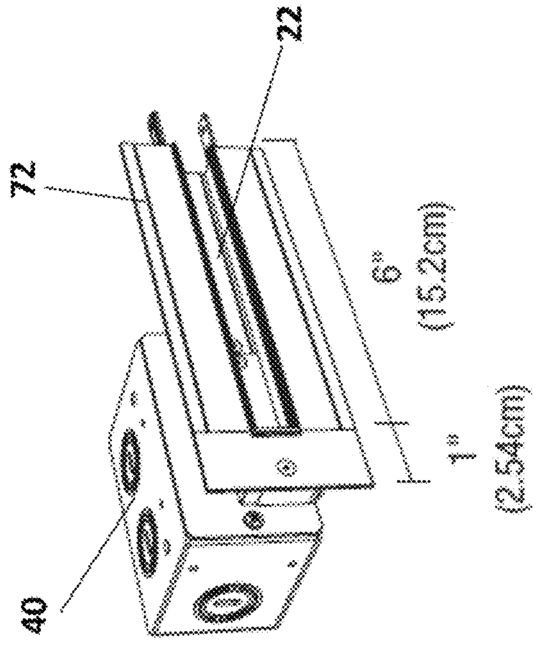
FIG. 12 is a perspective view of an embodiment of an end feed power channel connector.
Figure 13:
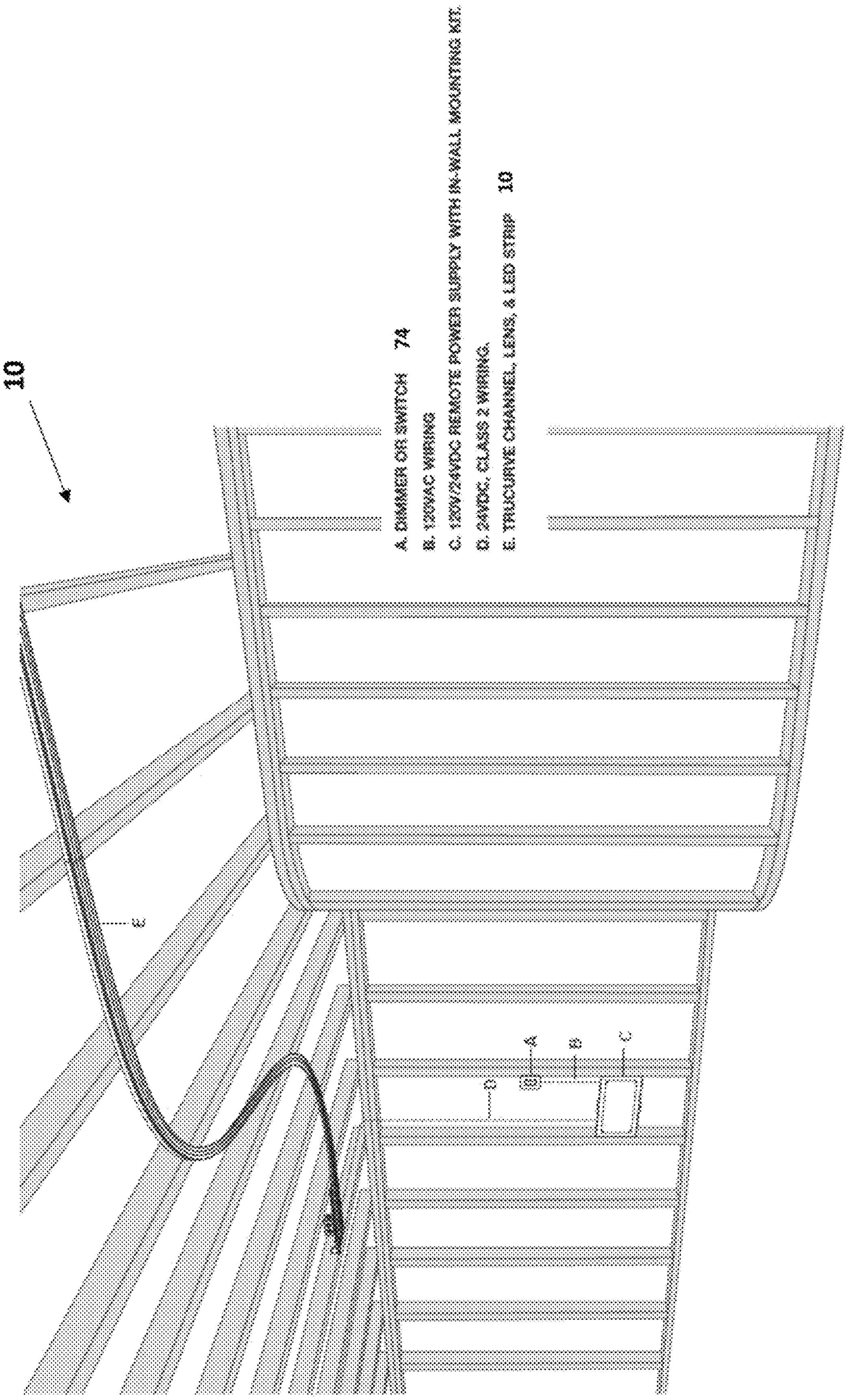
FIG. 13 is a perspective view showing another exemplary installation of the disclosed recessed channel lighting system.

Regarding installation, with reference to FIGS. 11-13, a channel for the system 10 is preferably cut into a wall or ceiling surface. The channel need only be wide enough to allow the recess of the housing channel 22, while the left and right flanges, 14 and 16, contact the surface. Power can be supplied to the lighting system 10 using a center feed power channel connector 70 (FIG. 11) and an end feed power channel connector 72 (FIG. 12). These connectors, 70 and 72, allow 24 VDC power to be fed to the LED strip(s) 26 within the channel 22. A junction box 40 can be mounted behind drywall using mounting bars, as is known in the art. The system 10 is powered by running low voltage 24 VDC wires from a remote power supply to the junction box 40 at the start of each installed length of the recessed channel lighting system 10. At an end of an installed length of the channel lighting system 10 an end cap provides a finished look and helps prevent light leaking at the feed end of a segment where the LED strip enters the channel 22 and connects to the junction box 40. An "on/off" switch or dimmer 74 may be used to control power to the lighting system 10.

Once the rigid structure of the lighting system 10 is fully constructed, including placement of LED strips 26, the flexible lens/diffuser 24 can be placed into the opening at the top of the housing channel 22. The lighting system 10 is then positioned within the channel cut into a surface and wired for power. Finishing the installation with joint compound and paint completes the project.

Figure 14:
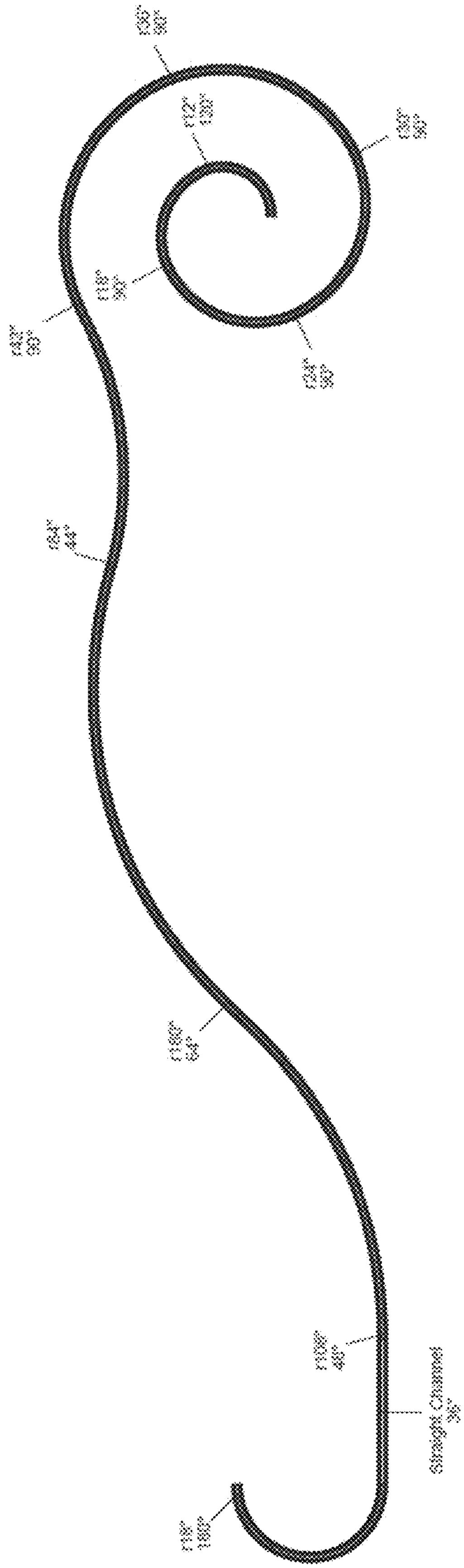
FIG. 14 is a top view of an exemplary lighting design having numerous curves using an embodiment of the disclosed recessed channel lighting system.

FIG. 14 illustrates an exemplary design comprised of both pre-fabricated sections 60 (see FIG. 5) and individual sections 12 (see FIG. 3B). For example, the left end of the system 10 is an 18-inch radius section with a 180° left bend, which can be achieved using two 9-inch pre-fabricated 90° bend sections. In the illustrated design, the 180° bend is followed by a 36-inch pre-fabricated straight channel section, a 108-inch radius section having a 48° left bend, a 180-inch radius section with a 64° right bend, an 84-inch radius section with a 44° left bend, then five radiused sections of 42-inches, 36-inches, 30-inches, 24-inches, and 18-inches, each with a 90° right bend, before a final 12-inch radius section having a 120° right bend. The possible design configurations are endless.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for creating a recessed lighting system comprising:

creating a curving design for a recessed lighting system;

creating a channel in a surface, wherein the channel follows the curving design;

placing a length of channel lighting within the channel of the surface, wherein the channel lighting comprises:

a plurality of first housing sections, wherein each first housing section comprises a base portion having an opening, a first flange having a first width, outer edges, and extending outward from the base portion, and a second flange having a second width, outer edges, and extending outward from the base portion in a direction opposite and coplanar to the first flange, wherein the outer edges on each of the first flange are angled relative to one another, and non-parallel and the outer edges on each of the second flange are angled relative to one another, and non-parallel;

a plurality of second housing sections, wherein each second housing section comprises a base portion having an opening, a first flange having outer edges and extending outward from the base portion and a second flange having outer edges and extending outward from the base portion in a direction opposite and coplanar to the first flange, wherein outer edges on each of the first flanges are parallel and the outer edges on each of the second flanges are parallel;

wherein the plurality of first housing sections and the plurality of second housing sections are configured to be arranged sequentially such that the angled, non-parallel first and second flanges of each of the plurality of first housing sections cause the base portions in consecutive housing sections to form a curved channel;

an LED strip positioned within the curved housing channel; and a flexible diffuser positioned within the curved housing channel to direct light from the LED strip through the opening of each base portion;

connecting a power source to the LED strip positioned within the housing channel; and concealing the first and second flanges against the surface using a building material.

2. The method of claim 1, wherein creating a channel in the surface is limited to no more than 5/16 inch deep.

3. The method of claim 1, wherein creating a channel in the surface crosses a plurality of joists supporting the surface without cutting into the plurality of joists.

4. The method of claim 1, wherein the first width is less than the second width.

5. The method of claim 4, wherein the first width tapers from an inside edge to an outside edge.

6. The method of claim 5, wherein the second width tapers from an outside edge to an inside edge.

7. The method of claim 6, wherein the width of the inside edge of first flange is approximately equal to the width of the inside edge of the second flange.

8. The method of claim 1, wherein a width of each of the plurality of first housing sections tapers from an outer edge of the second flange to an outer edge of the first flange.

9. The method of claim 8, wherein the base portion of each of the plurality of first and second housing sections has a depth not greater than 5/8 inches (0.625 inches).

10. The method of claim 1, wherein the base portion of each of the plurality of first and second housing sections has a depth not greater than 5/8 inches (0.625 inches).

11. The method of claim 1, wherein the channel lighting further comprises a plurality of flexible joiners configured to attach to and hold consecutive housing sections together.

* * * * *